Nov. 27, 1928. 1,693,127
G. F. WALTER ET AL
LUNCH KIT
Filed July 13, 1925 2 Sheets-Sheet 1

Nov. 27, 1928.
G. F. WALTER ET AL
1,693,127
LUNCH KIT
Filed July 13, 1925    2 Sheets-Sheet 2
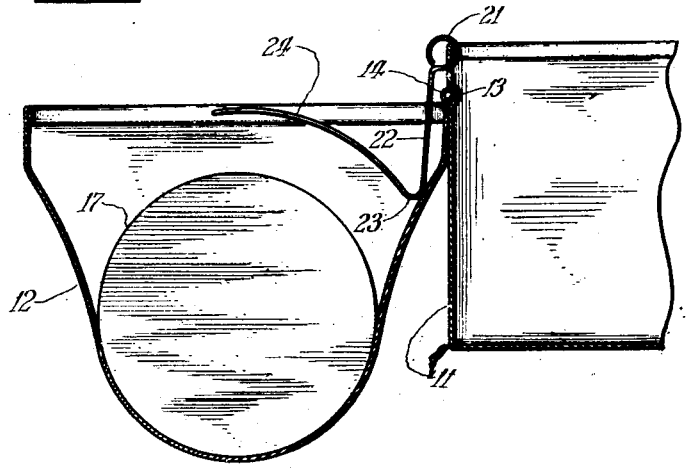
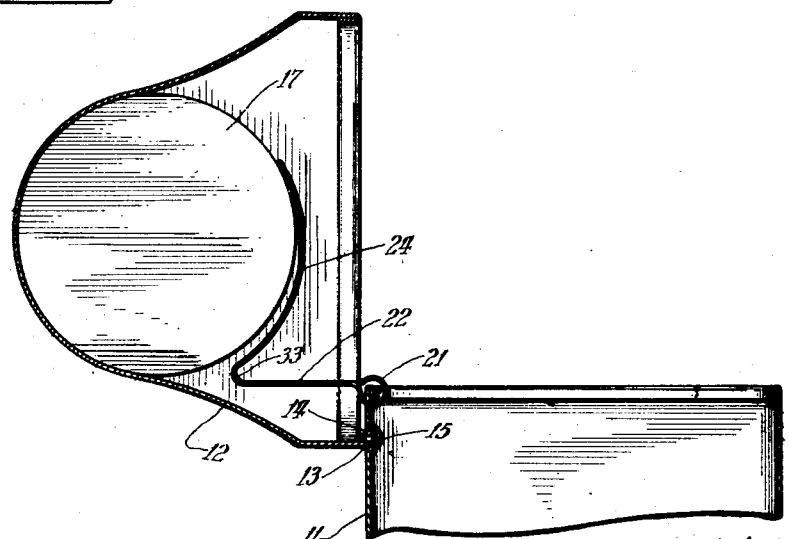

Patented Nov. 27, 1928.

1,693,127

UNITED STATES PATENT OFFICE.

GEORGE F. WALTER AND JOHN M. HOTHERSALL, OF BROOKLYN, NEW YORK, ASSIGNORS TO AMERICAN CAN COMPANY, OF NEW YORK, N. Y., A CORPORATION OF NEW JERSEY.

LUNCH KIT.

Application filed July 13, 1925. Serial No. 43,079.

Our present invention relates to containers and has for its principal object the provision of a lunch kit provided with an improvement in the means for supporting a thermos bottle, or the like, in the cover.

More particularly, the object of the invention is to provide, in a lunch kit, a bottle holder of the simplest and least expensive form consistent with efficiency and serviceability.

Another important object of the invention is the provision, in a lunch kit, of a bottle holder or clamp which will move into clamping position automatically, simultaneously with the closing of the cover, and which requires a minimum amount of support.

Numerous other objects and advantages of the invention will be apparent as it is better understood from the following description, which, taken in connection with the accompanying drawings, discloses a preferred embodiment thereof.

Referring to the drawings,

Figs. 3 and 4 are similar views, showing the cover in open and partially closed position, respectively, and illustrating the position of the retaining member prior to and during the closing of the cover.

Figure 1:
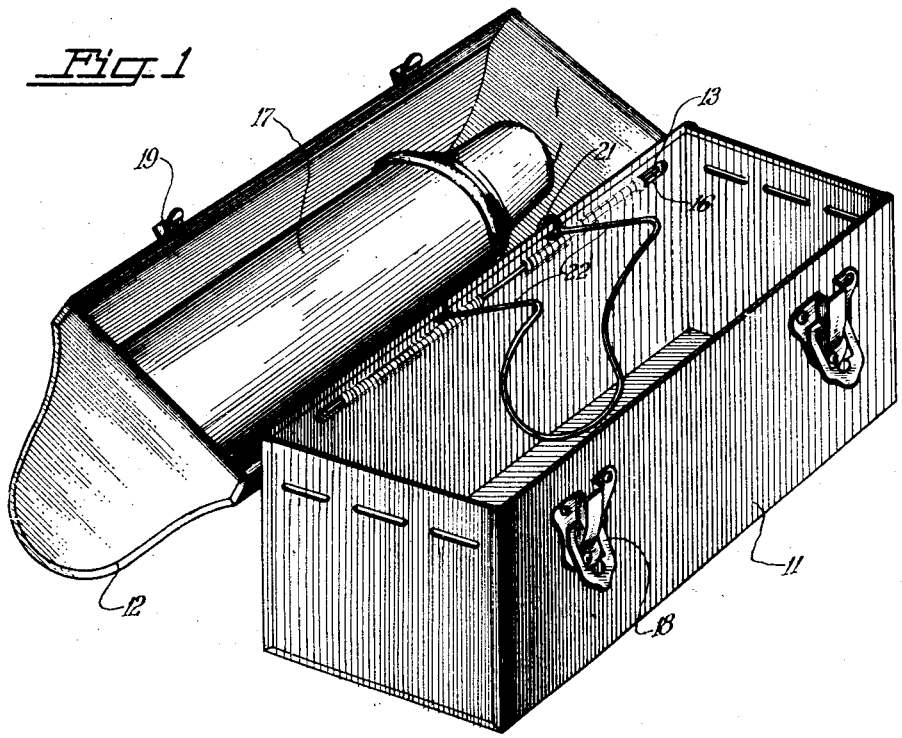
Figure 1 is a perspective view of a lunch kit provided with a thermos bottle retaining member made according to our invention, the cover being shown in open position and containing a thermos bottle, and the retaining member being arranged in position for insertion or removal of said bottle.

On said drawings, we have shown, for illustrative purposes only, a lunch kit having an oblong body 11, to which a cover 12 is hinged by means of a pintle 13 and hinge lugs 14 on the cover, said pintle being disposed in oppositely opening channels 15 and 16 formed in the rear wall of said body and the lugs being wrapped around outside portions thereof. Said cover is of campanulate form in cross-section and is adapted to receive a thermos bottle 17, fitting snugly within the curved top portion thereof. Said body and cover are provided with co-acting clasp members 18 and 19 to fasten the cover in closed position and the thermos bottle is adapted to be held in the cover and out of contact with the food in the kit by means of a retaining member, which will now be described.

Said member, in the present instance, is made of wire and is pivoted onto the top of the rear wall of the body 11 by means of loops 21 in the ends thereof extending through appropriately spaced apertures in said wall. Arms 22 extend out from said loops and the wire is bent at an acute angle at 23 to provide a supporting portion 24 shaped to conform to the contour of the thermos bottle. Said supporting portion is unsupported at its outer end and is of spring material adapted to resiliently hold the thermos bottle in the top of the cover.

Figure 2:
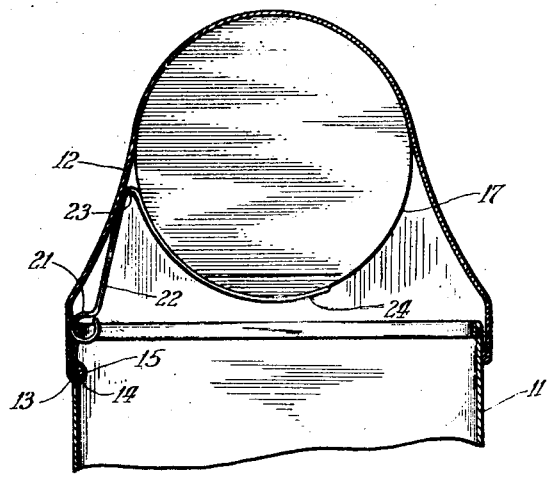
Fig. 2 is a fragmentary cross-sectional view of the kit with the cover closed.

When the box is open, said retaining member may be turned to the position shown in Fig. 1, entirely out of the cover, and the thermos bottle positioned as shown, after which said member may be turned to the position shown in Fig. 3, in which the ends of the arms 22 are in contact with the inner wall of the cover. The cover may then be turned upon its hinge, the supporting portion 24 of the retaining member being engaged as the cover is raised, as shown in Fig. 4, and the angular part 23 of said member being disposed between said thermos bottle and the hinged wall of the cover. As the cover is closed down upon the body, said angular part 23 of the retaining member is compressed, as shown in Fig. 2, the arms 22 extending further up the wall of the cover and the supporting portion 24 being pressed against the thermos bottle to hold the same firmly in its intended position in the cover. This engagement is effected automatically during the closing operation, it being only necessary to arrange said retaining member in the position shown in Fig. 3 after the bottle has been inserted, after which the cover may be closed without further manipulation of said member by the user. The movement of the cover in closing brings said retaining member into contact with the bottle and the latter is held in its position in the top of said cover at all times during the closing operation, as well as after. When the kit is open, said member may be moved to the position shown in Fig. 1 and the thermos bottle, or other article removed, it being evident that there are no parts which might tend to bind, or in any manner interfere with the free movement of either said retaining member or the cover.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

We claim:

1. A lunch kit, comprising a body, a cover hinged thereto, and means for retaining a thermos bottle, or like article, in said cover, said means comprising a pivotally mounted member having a portion extending upward to the bottle on a line directed above the center of the bottle and another portion extending thence downward under the bottle and having a free end, said member being arrangeable in the cover when the same is open and being adapted to engage and support said article when the cover is closed.

2. A lunch kit, comprising a body, a cover hinged thereto, and means for retaining a thermos bottle, or like article, in said cover, said means comprising a member pivoted to the body and extending towards the rear side of the bottle and thence across the under side of the bottle and having a free extremity, and arrangeable in the cover when the same is open and being adapted to engage and support said article when the cover is closed.

3. A lunch kit, comprising a body, a cover hinged thereto, and means for retaining a thermos bottle, or like article, in said cover, said means comprising a member hinged to the body having an unsupported supporting portion arrangeable in the cover when the same is open and being adapted to engage and support said article when the cover is closed, said supporting portion being shaped to conform to the contour of said article.

4. A lunch kit, comprising a body, a cover hinged thereto, and means for retaining a thermos bottle, or like article, in said cover, said means comprising a pivotally mounted member hinged to the body having an unsupported supporting portion arrangeable in the cover then the same is open and being adapted to engage and support said article when the cover is closed, said member having a part adapted to engage the wall of the cover when the latter is open to dispose said supporting portion in position to engage said article when the cover is closed.

5. A lunch kit, comprising a body, a cover hinged thereto, and means for retaining a thermos bottle, or like article, in said cover, said means comprising a member pivoted to the top of the body at the side to which said cover is hinged and arrangeable within the cover prior to closing the same, said member being unsupported at one end and being automatically engageable from its initial position in the cover with the article positioned therein to support the same when the cover is closed.

6. A lunch kit, comprising a body, a cover hinged thereto, and means for retaining a thermos bottle, or like article, in said cover, said means comprising a pivotally mounted member of spring wire hinged to the body above the hinge of the cover and having an unsupported supporting portion arrangeable in the cover when the same is open and being adapted to engage and support said article when the cover is closed.

7. A lunch kit, comprising a body, a cover hinged thereto, and means for retaining a thermos bottle, or like article, in said cover, said means comprising a member shaped to engage around a part of the circumference of the bottle and pivoted to the top of the body at the side to which said cover is hinged and adapted to be automatically pressed towards and against the bottle when the cover is closed.

8. A lunch kit, comprising a body, a cover hinged thereto, and means for retaining a thermos bottle, or like article, in said cover, said means comprising a pivotally mounted member shaped to engage around a part of the circumference of the bottle and adapted to be automatically pressed against the bottle by the closing movement of said cover.

GEORGE F. WALTER.
JOHN M. HOTHERSALL.